United States Patent [19]

Mickel et al.

[11] Patent Number: 5,524,327
[45] Date of Patent: Jun. 11, 1996

[54] MALLEABLE CLIP

[75] Inventors: Thomas J. Mickel, Jupiter; Stewart W. Willason, Palm Beach Gardens, both of Fla.

[73] Assignee: Mednext, Inc., West Palm Beach, Fla.

[21] Appl. No.: 339,144

[22] Filed: Nov. 14, 1994

[51] Int. Cl.$^6$ ............................. F16L 3/00; A61M 39/00
[52] U.S. Cl. ................. 24/115 A; 248/316.7; 248/52; 24/20 R; 24/129 B; 24/129 R; 24/703.1
[58] Field of Search .............................. 24/20 R, 20 CW, 24/129 R, 129 B, 129 W, 129 A, 115 A, 545, 563, 703.1; 248/74.1, 74.2, 51, 76, 316.7

[56] References Cited

U.S. PATENT DOCUMENTS

| | | | |
|---|---|---|---|
| 1,509,012 | 9/1924 | Whiting | 24/129 A |
| 1,654,340 | 12/1927 | McIntosh | 24/115 A |
| 2,466,912 | 4/1949 | Rice | 24/129 R |
| 2,769,999 | 11/1956 | Sheahan | 248/76 X |
| 2,858,590 | 11/1958 | Koch | 24/129 B |
| 2,974,383 | 3/1961 | Bright | 248/316.7 X |
| 4,928,634 | 5/1990 | Voigt | 24/129 RX |
| 5,333,821 | 8/1994 | Lee | 248/316.7 X |

OTHER PUBLICATIONS

Mednext "Angled Hose Clip" brochure, presented at the 98th Annual Meeting of the American Academy of Otolaryngology–Head and Neck Surgery Foundation, Inc. in San Diego, CA, Sep. 18–21, 1994.

*Primary Examiner*—Peter M. Cuomo
*Assistant Examiner*—Robert J. Sandy
*Attorney, Agent, or Firm*—Akin, Gump, Strauss, Hauer & Feld

[57] ABSTRACT

A malleable clip for reversible application to a power line which connects a power tool to a power source to alter the angular relationship and/or offset distance of the power tool with respect to the power line. Malleable clips comprise one or more malleable links adjustably coupling a plurality of adjacent circumferential clips end-to-end. The malleable links have lateral bending compliances which may be substantially unequal. One or more resilient links may also be present between adjacent circumferential clips in a malleable clip. The lateral bending compliances of the resilient links, if two or more are present, may be substantially unequal. Malleable clips may additionally comprise adjacent circumferential clips adjustably coupled by substantially longitudinally fenestrated malleable links which facilitate adjustment of the link lateral bending compliance. Malleable clips may be coated with substantially resilient or substantially malleable materials which, in conjunction with substantially transversely fenestrated links can provide multiphasic lateral compliance characteristics.

22 Claims, 5 Drawing Sheets

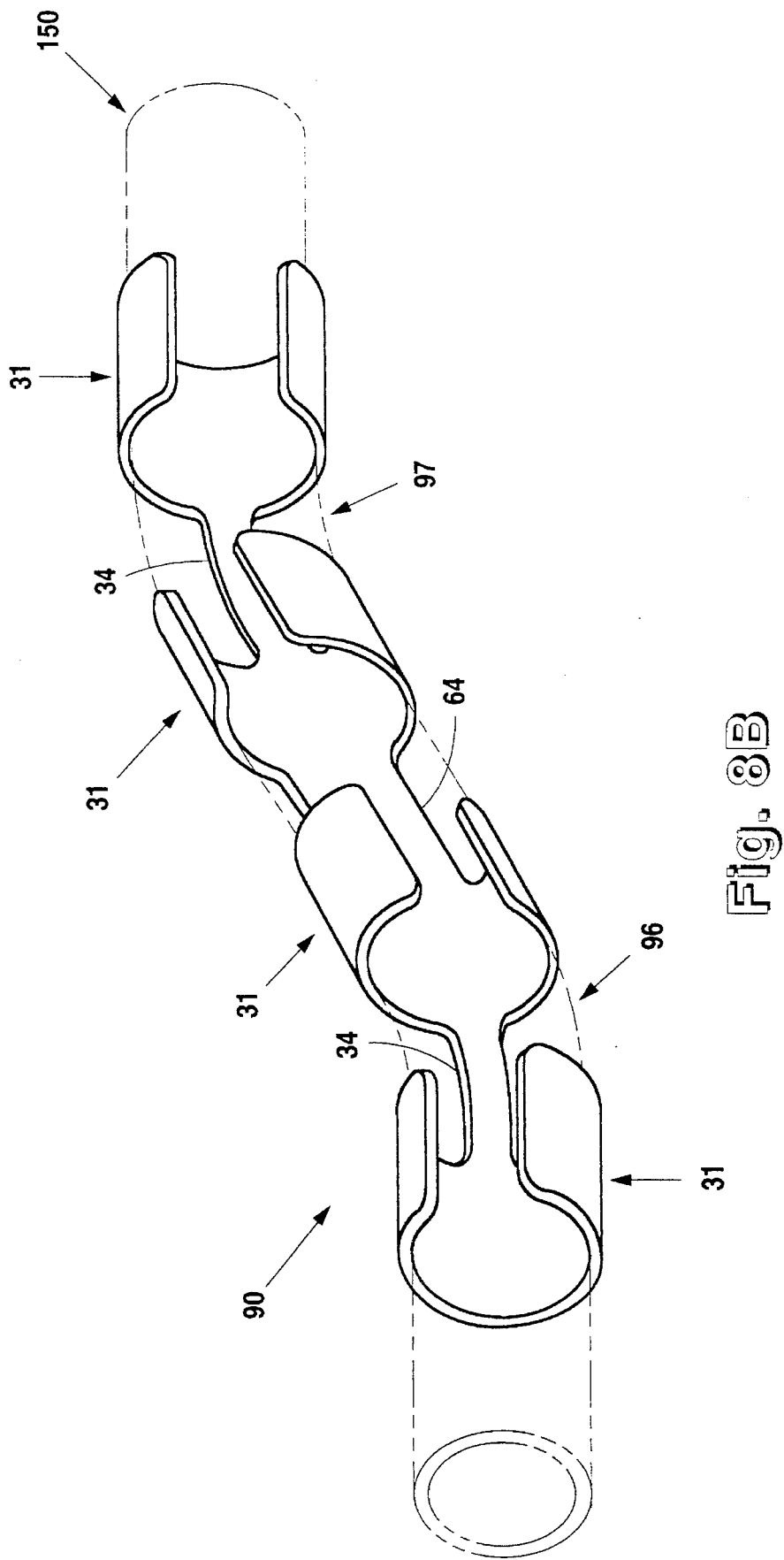

MALLEABLE CLIP

BACKGROUND

1. Field of the Invention

The invention relates to methods and apparatus for altering the lateral bending compliance of elongated flexible structures.

2. Power Line Forces on Tools

Movable tools are often driven by power transmitted from a separate source over flexible power lines (e.g., electrical cables, hoses carrying pressurized liquids or gases, or a rotating cable). Tool mountings (and human operators, in the case of hand-held tools) are subject to translational and rotational forces exerted on the tool by the power lines which effectively tether the tool to the power source. For hand tools, variable tether forces combine with the tool weight, inertial forces within the tool, and reaction forces applied to the tool by the workpiece to yield time-varying total linear force and total torque resultant vectors acting on the tool. For hand-held tools, the resultant linear force and torque vectors must be completely offset by counteracting linear forces and torques manually applied by a person wishing to effectively control the tool.

Optimal positioning of a power tool with respect to its tether line(s) can improve controllability by altering the magnitude and/or direction of resultant linear force and torque vectors. When the tether line is particularly stiff and/or heavy (e.g., as a high-pressure air or nitrogen hose) and the range of tool motion is relatively restricted, the tool is often designed with a fixed tether line connection point and spherical tether line-tool angle which minimizes interference of the tether line with tool movement and control. Alternatively, the direction and/or magnitude of tether forces can be adjusted from time-to-time for more general tool movement by changing the spherical angular relationship and/or lateral offset of the tool with respect to a tether line.

Angular measures and offsets are conveniently determined between the tangent to the tether line at the tool connection point and the longitudinal tool axis. In cases where these two lines intersect, the offset is necessarily zero and the spherical tether line-tool angles comprise the longitudinal and circular angles between the tether line and the power tool. The longitudinal tether line-tool angle is that angle between the tether line tangent and the longitudinal tool axis. The circular tether line-tool angle is the angle, measured as projected in a plane substantially perpendicular to the longitudinal tool axis, between a chosen reference or index tool feature (e.g., the tool handle) and the tether line tangent at the connection point. Where the tether line connection point to the tool is laterally offset so that the tangent to the tether line at the connection point does not intersect the longitudinal tool axis, the longitudinal tether line-tool angle is measured about the perpendicular constructed between the axis and the tangent. (Note that the length of this perpendicular is a measure of the lateral offset distance.) The circular tether line-tool angle is measured in a plane perpendicular to the longitudinal tool axis which contains the above constructed perpendicular and a projection of the chosen index tool feature.

A tension force on a laterally offset tether line as defined herein will exert a torque about the longitudinal tool axis (and perhaps one or both of the orthogonal tool axes as well). Even without a lateral offset or tension force, however, a torque may be transmitted directly by the tether line. For example, in many high-pressure hoses, changing gas pressures in the hose (associated with changing tool speeds and loads) result in a reversible longitudinal twisting of the hose which may then be directly transmitted as torque to the tool. This torque may be augmented or cancelled in part by other torques generated during tool movement.

In particular, the degree, direction and speed of change in the spherical tether line-tool angles, the stiffness and weight of the tether line, and any torque or tension (including inertial forces) acting on the tether line will potentially alter the resultant magnitude and direction of any change in tether forces on the tool. Relatively stiff and/or heavy lines will be associated with larger tether force variations during tool movement than lighter and/or more compliant lines. Changes in connection of tether lines to a tool (as, for example, to accommodate left-handed and right-handed operators) will also result in tether force changes that are a function of the line characteristics as well as the connection point location and orientation.

To aid flexibility in the control of tether line forces, commercially available tools (e.g., nitrogen-powered bone drills) may include as optional attachments two or more angular connectors which can be interchangeably mounted on the tool at any of several circular tether line angles while maintaining a substantially constant longitudinal tether line angle. These attachments, e.g., might allow joining a bone drill to a pressurized nitrogen hose at a fixed longitudinal angle of 20°, 70°, or 90°, and at a circular tether line angle between 0° and 180°. The choice of these parameters when the drill is assembled will generally change tether forces on the drill in a predetermined fashion. Due to the wide variety of positions in which a bone drill might be used, however, as well as the substantial range of stiffness in commonly used pressurized nitrogen hoses, the most desired spherical tether line-tool angles (especially the longitudinal angle) may be only approximated with the above attachments. To the extent that actual angles differ from optimal angles, tool controllability may be degraded.

To more closely approximate the specific tether line-tool angles desired, a continuously adjustable compound high-pressure swivel joint may be inserted in the nitrogen line. Such joints, however, are relatively expensive and subject to high-pressure gas leaks. Thus, a need exists for a relatively inexpensive, durable, and easily adjustable means of altering tether line forces on power tools.

SUMMARY OF THE INVENTION

The malleable clip of the present invention answers the need for adjustability in tether forces described above. Embodiments of the invention comprise relatively inexpensive devices which can be reversibly applied to a wide variety of tool tether lines and which facilitate substantially continuous adjustment of the tether line-tool angle and, in certain embodiments, substantially continuous adjustment of the tether line lateral offset distance as well. Malleable clips can be readily designed to accommodate a wide range of tether line surfaces by appropriately limiting surface loading. And they can also be employed to alter tether line lateral compliance in substantially predictable ways. The general design of malleable clips (i.e., comprising circumferential clips spaced apart in arrays and coupled end-to-end by links) allows design adjustments of lateral compliance to be substantially separable from design adjustments of surface loading. That is, lateral compliance may be initially specified substantially independently of tether line surface loading.

Malleable clips all comprise a plurality of circumferential clips, each circumferential clip having a first end, a second end, a length measurable between the first and second ends, a diameter, a gap, and a gap angle. The circumferential clips are spaced apart and arranged substantially end-to-end in a clip array. Each two adjacent circumferential clips in each clip array are adjustably coupled by a malleable link, springingly coupled by a resilient link, or coupled by a malleable link having a multiphasic lateral compliance characteristic. The lateral bending compliances of malleable and resilient links may be substantially uniform in certain embodiments, but in general the resilient link compliance(s) will preferably be greater than the least of the malleable compliances in any given malleable clip to provide at least partial protection for the malleable link(s) against inadvertent distortion.

Note that the lateral bending compliance of a malleable link refers to the lateral displacement per unit of lateral force required as the link's longitudinal axis is bent into a curve which the link will preferably maintain until the curve is intentionally adjusted by further bending. Lateral bending compliance of a resilient link, on the other hand, refers to that lateral displacement per unit of lateral force required as the link's longitudinal axis is bent into a temporary new shape, with the link tending to return to the starting shape as soon as the lateral force in question is reduced or removed.

Circumferential clips generally have a hollow, substantially right circular cylindrical shape with a gap extending between the first and second ends. In preferred embodiments, the gap may be substantially uniform with substantially straight edges oriented substantially longitudinally. However, neither straight gap edges nor a strictly longitudinal gap orientation are essential. For example, serrated or scalloped-edge gaps (with mating or non-mating edges), skew gaps (not being substantially longitudinally oriented), and gap edges surfaced or otherwise treated to alter frictional or other characteristics related to passage of a tether line through the gap are all embodiments of the present invention.

Note also that in certain embodiments of a malleable clip, the gap (and its associated gap angle) for one or more circumferential clips may be zero. Such zero-gap circumferential clips must of course be applied (substantially longitudinally) over a loose end of a tether line, whereas a circumferential clip with a sufficiently large gap angle (i.e., a sufficiently wide gap) can admit a tether line introduced through the gap (and thus into the clip) substantially laterally.

Each serially positioned (i.e., end-to-end) pair of circumferential clips in an array are preferably coupled with a single link which may have a predominantly malleable characteristic, a predominantly resilient characteristic, or a multiphasic characteristic. A link having a multiphasic characteristic may be nonlinearly malleable, nonlinearly resilient, or substantially malleable in a portion of its range of motion and substantially resilient in a separate portion of its range of motion. Malleable links preferably comprise at least one substantially malleable material (e.g., stainless steel), while resilient links preferably comprise at least one substantially resilient material (e.g., spring steel). Multiphasic links preferably comprise two or more substantially layered and/or interdigitated materials.

For example, a malleable clip comprising a substantially malleable base material (e.g., stainless steel) may have one or more of its malleable links at least partially coated with a substantially resilient (e.g., plastic or rubber) outer layer. Such a resiliently-coated malleable clip may cause less abrasion or other contact damage to a tether line to which the malleable clip is applied, and it will also tend to have a resilient characteristic for relatively small displacements of a tether line to which it may be applied.

A further function for such a resiliently-coated malleable clip is illustrated in another embodiment of the above coated malleable clip comprising at least one malleable link having one or more fenestrations substantially transverse to the malleable clip longitudinal axis. The fenestrated link would then be at least partly coated with an outer layer of a substantially resilient material (e.g., plastic or rubber) which at least partly penetrates and/or interdigitates with the (at least one) fenestration. Relatively large-displacement bending of this resiliently-coated malleable link would tend to malleably deform the link to a new preferred shape and thus be substantially resisted by the (adjustable) malleable property of the coated link. In contrast, relatively medium-displacement bending of the malleable link which tends to substantially compress at least a portion of the fenestration(s) without substantial malleable deformation of the link) would tend to be substantially resisted by the resilient action of the outer layer material being compressed within the fenestration(s). Thus, such a resiliently-coated malleable clip can be made to exhibit a substantially multiphasic lateral compliance characteristic, with variable malleability and resilience functions (depending on radii of curvature of the bend(s) sustained by the link) in the same fenestrated link and with the two properties being at least partly independently specified.

Analogously, a malleably-coated malleable clip may comprise a malleable link of substantially malleable base material (stainless steel, for example) having one or more fenestrations substantially transverse to the malleable clip longitudinal axis as above, but coated as above with a layer of a material having a substantially greater malleability and/or a lower modulus of elasticity (e.g., lead or tin alloys) than the base material. Such a malleably-coated malleable clip can be made to exhibit a multiphasic (in this case, substantially non-symmetric) lateral compliance characteristic. Initial bending along the malleable clip longitudinal axis in a direction which would tend to cause compression of the outer layer material within the fenestration(s) would be associated with relatively low lateral compliance. In contrast, bending along the malleable clip longitudinal axis in a direction which would tend to relieve compression of the outer layer material within the fenestration(s) (or at least tend to avoid further compression of the outer layer material) would be associated with relatively higher lateral compliance. Such a clip could be used to relatively strongly resist kinking in power lines while allowing the same lines to become straighter with application of relatively smaller lateral force.

BRIEF DESCRIPTION OF THE DRAWINGS

FIG. 8B schematically illustrates a perspective view of a phantom tether line within the malleable clip of FIG. 8.

DETAILED DESCRIPTION

In the following description and the accompanying Figures, certain components (e.g., circumferential clips, malleable links, and resilient links) appear repeatedly in substantially the same form but associated with different combinations of other components. In such cases, components of substantially the same configuration are similarly labeled in the several Figures where they appear. When, however, a component is illustrated in two or more embodiments differing substantially in shape, composition or other material respect, different labels and/or written descriptions identify the different embodiments illustrated or represented.

Figure 6:
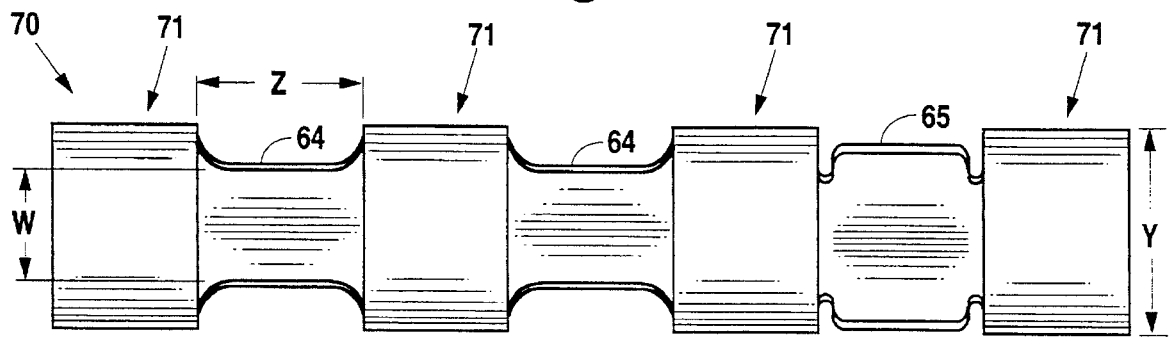
FIG. 6 schematically illustrates a malleable clip comprising a four-clip array similar to that of FIG. 5 except that the array comprises closed clips (i.e., clip gaps are zero).

In embodiments of malleable clips (20,30,30',40,50,60, 70,80,90,100) of the present invention, circumferential clip length X (FIG. 2A), which is measurable between each circumferential clip's first and second ends 32,33 respectively, is chosen in part depending on the desired degree of resistance to clip expansion (i.e., resistance to widening of the circumferential clip gap 35 (FIG. 2A) as a tether line is inserted or removed). The desired surface loading for the tether line to which each circumferential clip 31,71,111 will be applied and the compliance of the malleable links 34,64, 84,104 and/or resilient link(s) 65 (and 114 if coating 118 is substantially resilient) coupled to that circumferential clip also aid in determining clip length X. The optimal combination of clip expansion resistance, clip length X, and the compliance of the link or links coupled to a circumferential clip will preferably be empirically confirmed for each tether line application. Note that circumferential clips 31,111 comprise a gap 35 (see FIG. 2A), whereas circumferential clips 71 (see FIG. 6) have a zero gap and must therefore be applied to a tether line by sliding substantially longitudinally over one end of the line.

Figure 8:
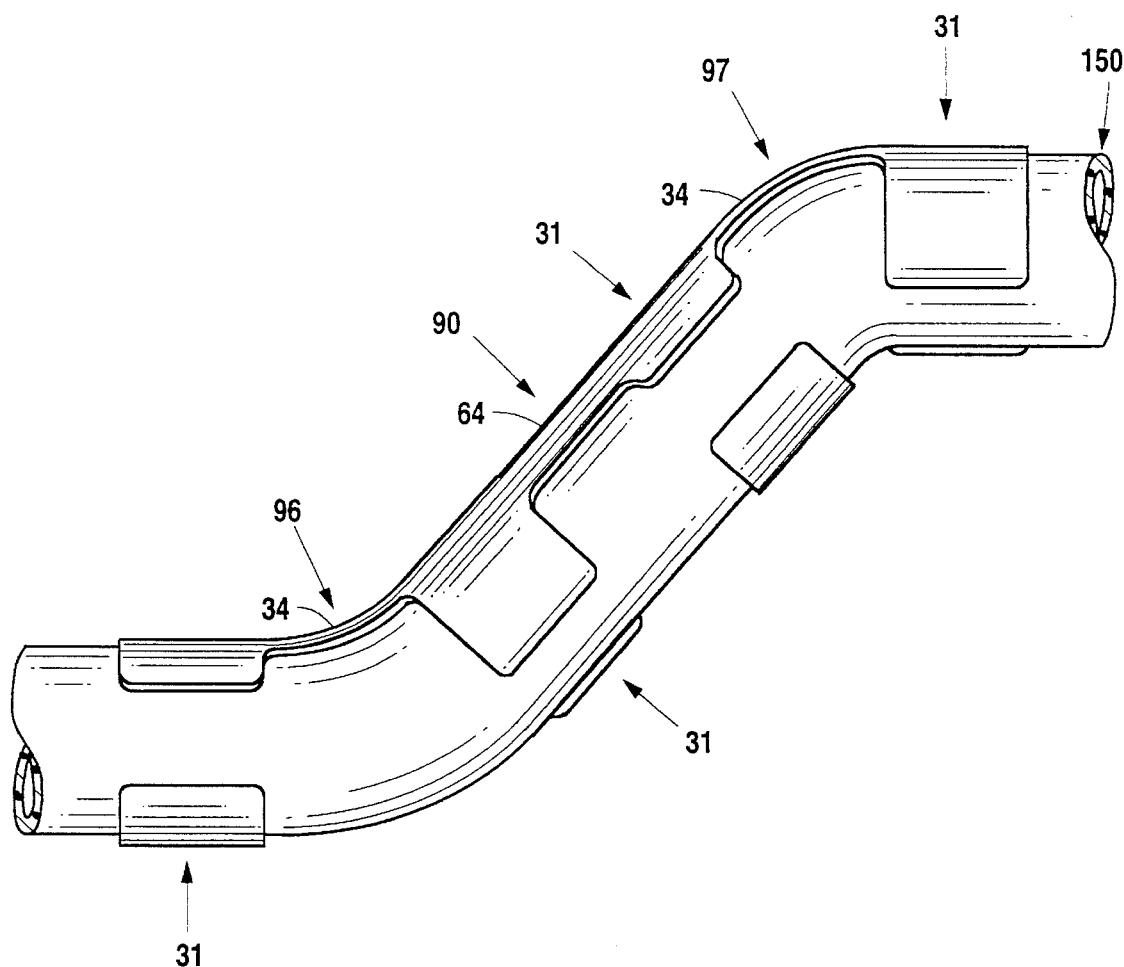
FIG. 8 schematically illustrates a tether line within a malleable clip comprising a four-clip array and three malleable links, the longitudinal bending compliance of each of the outer malleable links being less than that of the center malleable link.
Figure 8A:
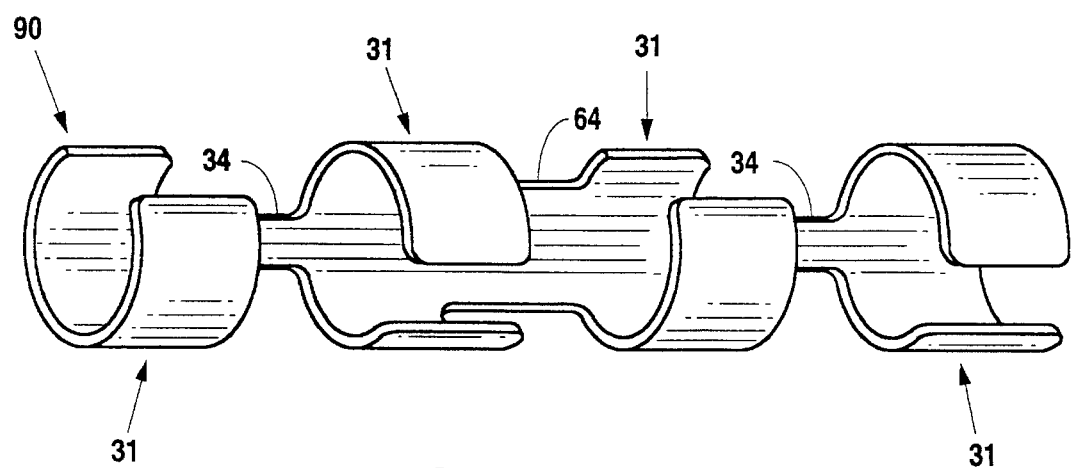
FIG. 8A schematically illustrates a perspective view of the malleable clip of FIG. 8 (without bends).

Clip arrays (for example, 123 in FIG. 2) adjustably coupled by malleable links (34,64,84,104) are intended to impart one or more substantially predetermined (but adjustable) bends to any tether lines (150, FIGS. 8 and 8B) or to change the lateral bending compliance of tether lines to which they are applied. Thus, tether line inherent lateral compliance (i.e., lateral deflection along a longitudinal axis per unit of applied lateral force) determines the amount of force required to maintain a bend in the line in the absence of inertial or tension forces on the line. Where maintaining a bend in a tether line is desired to alter a tether line-tool spherical angle or offset, the malleable clip lateral compliance will preferably be equal to or less than the tether line inherent lateral compliance throughout the length of the bend. Malleable clip compliance, in turn, depends substantially on the compliance of the malleable link(s) proximate each portion of the bend in question. Malleable link compliance must be consistent with clip expansion resistance, the clip gap 35, clip diameter Y, and the clip length X to assure stability of the malleable clip on the tether line and avoid excessive surface loading of the tether line.

Optimal clip parameter sets for certain applications represent a balance, determined at least partly empirically, among the related parameters. For example, a circumferential clip cut from relatively thin-wall stainless steel tubing may expand easily to slip over a tether line 150, whereas a circumferential clip of thicker-wall stainless steel tubing would expand less easily and may require a wider clip gap 35 for clips of equal length applied to the same tether line. Because circumferential clips must be reversibly applied to a variety of tether lines without damaging either clip or line, and because durability is important in a clip which may be reused many times, malleable clips are preferably made of a durable and easily cleaned and sterilized material (e.g., stainless steel). Circumferential clips should have sufficient thickness to achieve a desired level of clip strength (including resistance to removal of the clip from a tether line) with a clip gap 35 which subtends a central clip gap angle ct (having its vertex at the longitudinal axis of the clip) of about 65° to about 105°, preferably about 80°. Note that to reduce the likelihood of accidental disconnection of a malleable clip from a tether line, clip gap angles preferably do not substantially overlap but instead are oriented with their bisectors at gap rotation angles β (measured in a plane perpendicular to the clip longitudinal axis AA (see FIG. 4A) between adjacent clip angle bisectors) between about 90° and 180°. Note that the gap rotation angle β is measured between the radial clip angle bisector E and the longitudinally displaced radial clip angle bisector D', the latter bisector having been longitudinally displaced from its position D indicated on the adjacent circumferential clip.

Figure 1:
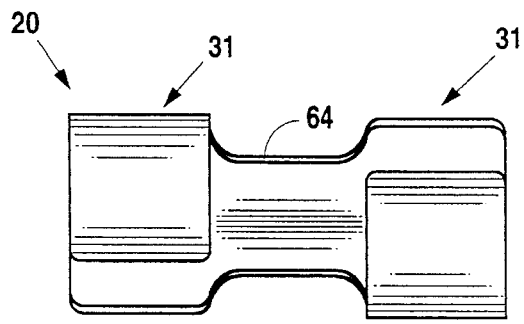
FIG. 1 schematically illustrates a plan view of a malleable clip comprising first and second circumferential clips in a two-clip array and a malleable link coupling the circumferential clips.
Figure 1A:
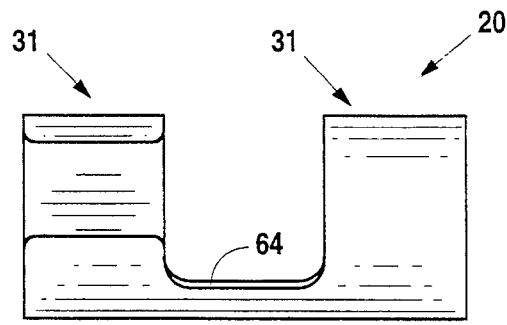
FIG. 1A schematically illustrates a front elevation of a malleable clip comprising a two-clip array and a malleable link.
Figure 2:
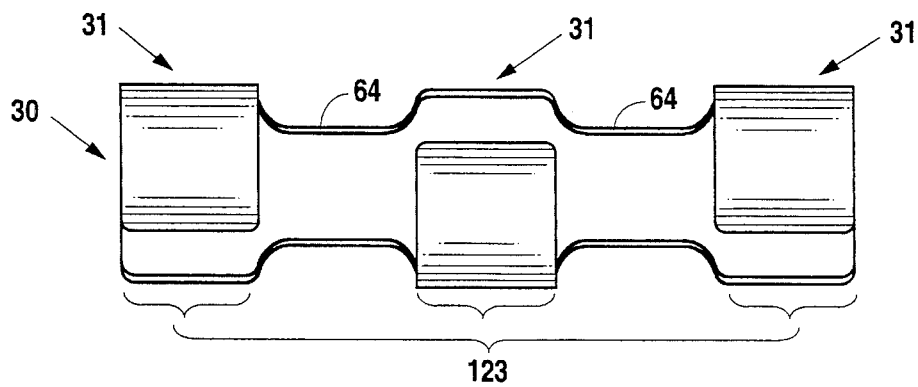
FIG. 2 schematically illustrates a malleable clip comprising a three-clip array and two malleable links for relatively large radius bends.
Figure 2A:
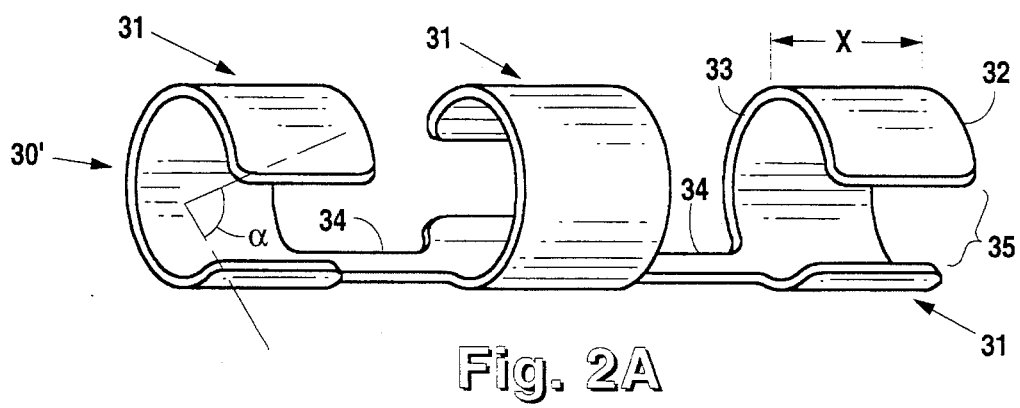
FIG. 2A schematically illustrates a perspective view of a malleable clip comprising a three-clip array and two malleable links, the links having a lower width to length ratio than those in FIG. 2.
Figure 3:
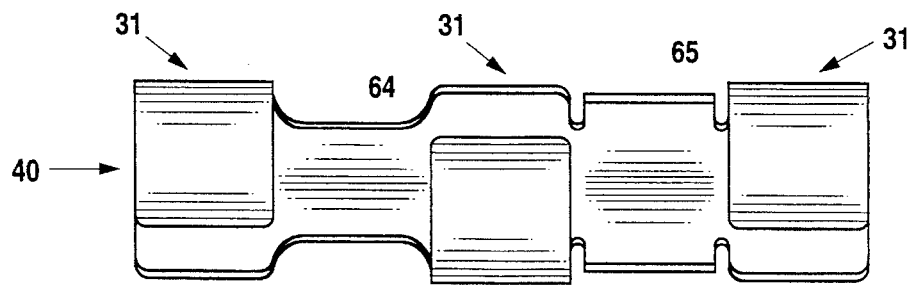
FIG. 3 schematically illustrates a malleable clip comprising a three-clip array, one malleable link and one resilient link.
Figure 4:
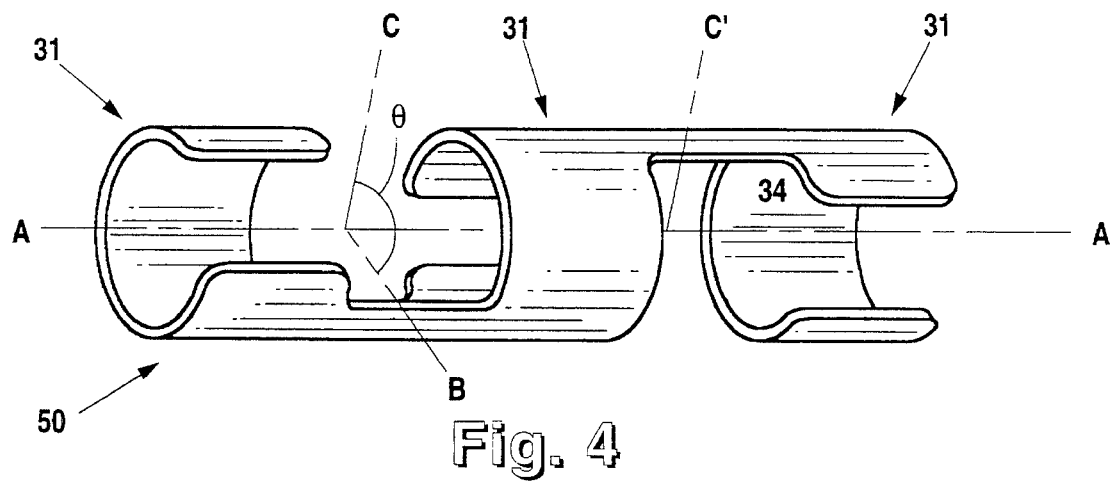
FIG. 4 schematically illustrates a malleable clip comprising a perspective view of a three-clip array for imparting a lateral offset and out-of-plane bend.

Another angular measure analogous to the gap rotation angle (and measured analogously in a parallel plane) is the link rotation angle Θ, which is that angle between radial bisectors of the link width angles subtended at the clip longitudinal axis AA by adjacent links in a malleable clip 50 (see FIG. 4). Note that the link rotation angle Θ is measured between the radial link width angle bisector B and the longitudinally displaced radial link width angle bisector C', the latter bisector having been longitudinally displaced from its position C indicated on the adjacent link. Link rotation angles Θ are important to malleable clip function because in embodiments where link width (W in FIG. 6) is a substantial fraction (greater than about 1/10) of link length (Z in FIG. 6), link bends (i.e., lateral bending displacement) will preferably be in a plane substantially perpendicular to the link width measurement. Such a relatively high width-to-length ratio link configuration is schematically illustrated as links 64 in FIGS. 1, 1A, 2, 3, 5, 6, 8, 8A and 8B. In contrast, a relatively low width-to-length ratio link configuration (less than about 1/10) is schematically illustrated as links 34 in FIGS. 2A, 4, 4A, 8, 8A and 8B. Note that FIGS. 2 and 2A schematically illustrate the same configuration of malleable clip 30,30' except that the width-to-length ratio of the links is greater for the links 64 (configuration 30) than for the links 34 (configuration 30').

For relatively high width-to-length ratio links, the width measurement is preferably substantially perpendicular to the plane of any curve of which the link a part. Deviation from this preferable configuration is less strongly resisted by links with relatively low width-to-length ratio. For any malleable clip bent into a series of in-plane curves (see FIGS. 8 and 8B), the links will preferably be either on the inside of the curve (see 96) or on the outside of the curve (see 97). That is, the link rotation angle β will preferably equal substantially 0° or substantially 180°. In the case schematically illustrated in FIGS. 8, 8A and 8B, the resistance of the links 34 to deviation from this preferred configuration will be significantly less than the resistance of link 64 to deviation from this preferred configuration.

Figure 4A:
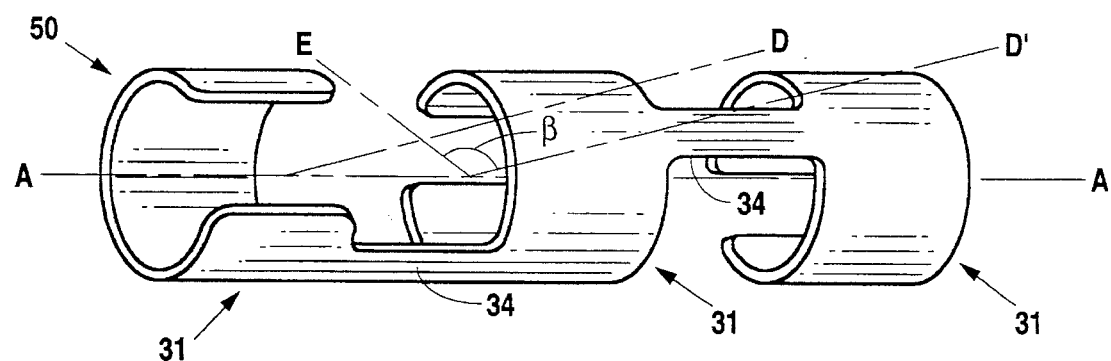
FIG. 4A schematically illustrates a malleable clip similar to that of FIG. 4 but having different gap rotation and clip rotation angles.
Figure 5:
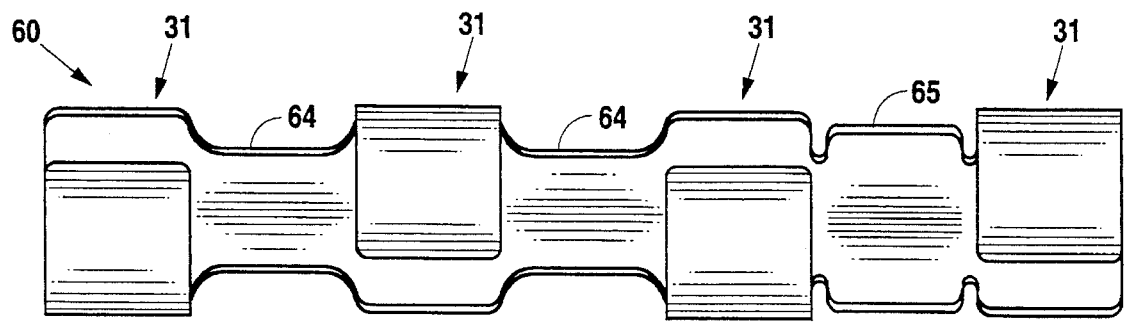
FIG. 5 schematically illustrates a malleable clip comprising a four-clip array, two malleable links, and one resilient link.

For a malleable clip to be bent into a series of out-of-plane curves (see FIGS. 4 and 4A), the link rotation angle β will preferably lie within the range of 0°–180°. For example, FIG. 4A illustrates a malleable clip with a link rotation angle of about 90°.

Circumferential clips 31,71,111 (having relatively large diameter Y) and those circumferential clips intended for use on relatively non-compliant tether lines (e.g., high-pressure gas hoses) will tend to require relatively thicker wall material. Thicker material will tend to allow shorter clip lengths X, although the interaction between tether line compliance and clip length X must result in a tether line surface loading under the clip which does not exceed that recommended for the tether line in question (to avoid substantial tether line deformation or surface damage).

A malleable clip parameter which is related to surface loading but at least partly independently predetermined by malleable clip design is lateral (bending) compliance. The circumferential clips 31,71,111 which comprise a malleable clip tend to significantly lower lateral compliance of a tether line. In contrast, the malleable links 34,64,84,104 which adjustably couple one or more adjacent circumferential clips, while also lowering lateral compliance in a substantially predetermined manner, generally do so to a lesser extent than the circumferential clips. Because the lateral force exerted by a circumferential clip 31,71,111 in maintaining a bend in a tether line 150 is relatively more effective as distance from the bend increases, higher compliance malleable links may be chosen to couple circumferential clips near the ends of multi-clip arrays (where the radius of curvature of the tether line along its longitudinal axis tends to be relatively larger). In contrast, circumferential clips 31,71,111 near where the radius of curvature of a tether line along its longitudinal axis is relatively smaller would preferably be coupled with relatively low compliance malleable links. Thus, preferred embodiments of malleable clips may include a gradient of lateral compliance, substantially decreasing as one moves from either end of the clip array toward the portion which would have the shortest radius of curvature (and would therefore be exposed to generally larger forces tending to straighten the clip) when applied to a tether line. In such compliance gradient embodiments, the relatively high compliance malleable links near the ends of the clip array (which are relatively more easily deformed than lower compliance links) may be at least partly protected against accidental malleable deformation by one or more circumferential clips which are springingly coupled to either end of the clip array with resilient links which themselves have relatively high compliance.

Embodiments of the invention intended for use in conjunction with hand tools would preferably be manually adjustable as to the exact degree and orientation of the bend(s) which can be imposed therewith on a tether line 150. To that end, materials having a moderate tensile strength (e.g., type 304 stainless steel) are preferable for malleable links. Because of their relatively rigid shape, circumferential clips may be made of the same material without incurring excessive penalties in distortion of the clips under load. However, certain applications requiting lighter weight would preferably include a higher strength material for the circumferential clips (e.g., Inconel), thus allowing a reduction in clip thickness.

Figure 7:
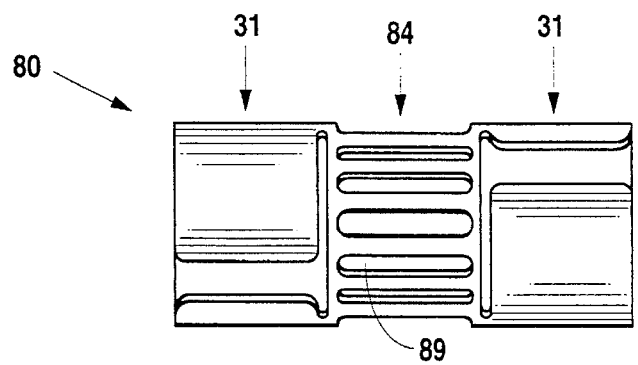
FIG. 7 schematically illustrates a malleable clip which comprises a longitudinally fenestrated malleable link having adjustable lateral compliance.
Figure 9:
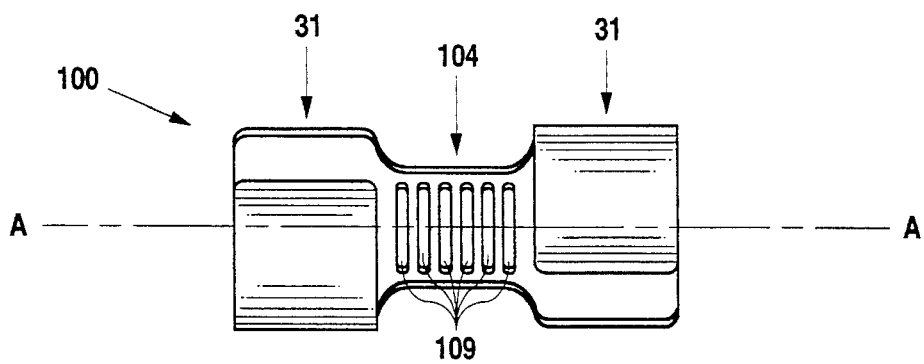
FIG. 9 schematically illustrates a malleable clip which comprises a transversely fenestrated malleable clip with multiphasic lateral compliance.

Other embodiments of a malleable clip requiring some adjustment capability for malleable link lateral compliance may incorporate a substantially longitudinally fenestrated malleable link 84 (see FIG. 7) wherein one or more of the plurality of substantially longitudinal malleable members 89 may be easily removed (as by clipping with wire cutters) to increase lateral compliance.

Where a malleable clip comprises a malleable link which in turn comprises a plurality of fenestrations 104 (see FIGS. 9 and 9A) which are substantially transverse to the malleable clip longitudinal axis AA, link lateral compliance will in general be multiphasic, having a generally higher value when lateral bending does not result in closure of one or more fenestrations 109. After one or more fenestrations 109 substantially close, link lateral compliance can be expected to decline for continued bending in the direction which causes increased closure of fenestrations 109. For bends in the opposite direction (i.e., the direction wherein fenestrations 109 tend to open further), compliance may be expected to be substantially constant over substantial lateral displacements. Thus, the compliance of such a substantially transversely fenestrated link may be substantially asymmetric.

Figure 9A:
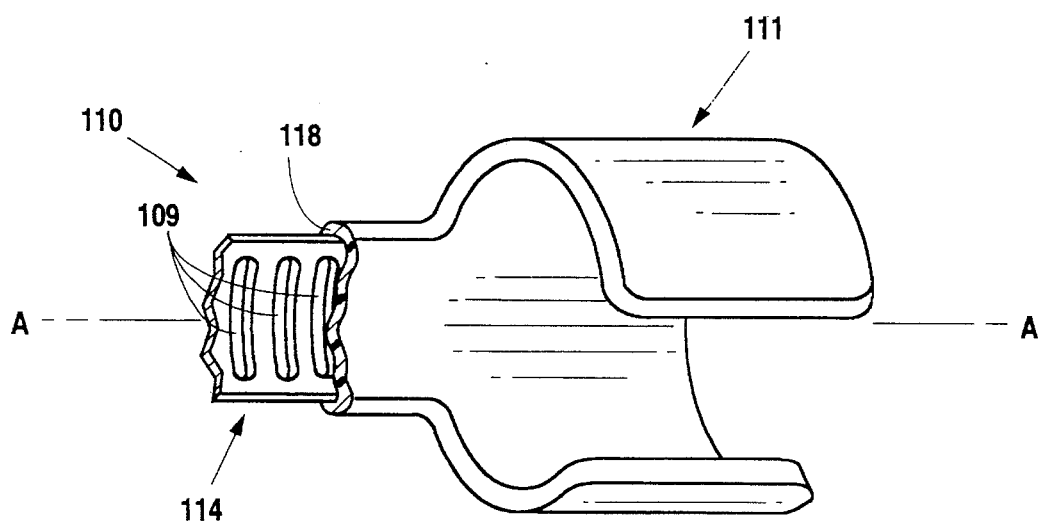
FIG. 9A schematically illustrates a cut-away view of the malleable clip of FIG. 9 additionally comprising a coating of resilient or malleable material.

FIG. 9A schematically illustrates a cut-away section of still another embodiment of a malleable clip 110 with a coated, substantially transversely fenestrated malleable link 114 and a coated circumferential clip 111. Coating 118 may, as noted above, be substantially resilient material or substantial malleable material. A coated circumferential clip 111 may be employed primarily to provide (when resiliently-coated) a substantially resilient lateral compliance characteristic for small lateral displacements of a tether line to which clip 111 is applied.

Additional desirable characteristics are evident when coating 118 substantially covers at least a portion of substantially transversely fenestrated malleable link 114, with coating 118 penetrating at least a portion of fenestrations 109 so as to substantially interdigitate with at least a portion of fenestrations 109. If coating 118 is substantially resilient, link 114 will have a multiphasic combination resilient-malleable lateral compliance characteristic for bends which tend to compress resilient coating 118 within fenestrations 109. For bends which do not tend to compress resilient coating 118 within fenestrations 109, a smaller resilient characteristic is expected due to the surface effect of coating 118 on link 114.

Still another multiphasic combination lateral compliance characteristic may be obtained if coating 118 is substantially malleable but has a lower modulus of elasticity than link 114 has without coating 118. For this embodiment, lateral compliance is relatively larger for bends which do not tend to compress malleable coating 118 within fenestrations 109, relatively smaller for bends which do tend to compress malleable coating 118 within fenestrations 109 but which do not tend to close one or more fenestrations 109 completely, and relatively smaller still for bends which tend to compress malleable coating 118 within fenestrations 109 and which also tend to close one or more fenestrations 109 substantially completely.

Note that in any embodiments of the malleable clip in which closure of substantially transverse link fenestrations 109 may alter lateral compliance, the tendency to closing of the fenestrations associated with link bends in a given direction may be enhanced or reduced by moving at least a portion of the link fenestrations (respectively) closer to or further from the center of curvature for the link. One method of moving the fenestrations is by bending the fenestrated link about an axis substantially perpendicular to the (substantially transverse) fenestrations. FIG. 9A schematically illustrates a link 114 with such a transverse bend. Note that when a malleable link is cut out of substantially round tubular stock, the above transverse bend (with the same radius of curvature as the tubular stock) will appear in all links. For each such link, the radius of transverse curvature can be increased (by flattening the link) or decreased of left unaltered, depending on the contribution to the link bending characteristic which is desired to be related to closure of fenestrations 109.

What is claimed is:

1. A malleable clip, comprising
   first and second circumferential clips, each said circumferential clip having a first end, a second end, a length measurable between said first and second ends, a diameter, a gap, and a gap angle, said first and second circumferential clips being spaced apart and arranged substantially end-to-end in a two-clip array, wherein said first and second circumferential clip gap angles do not overlap; and a malleable link adjustably coupling said first and second circumferential clips.

2. The malleable clip of claim 1 wherein said first and second gap angles are about 80°.

3. The malleable clip of claim 1 wherein said gap angles are spaced about 180° apart.

4. The malleable clip of claim 1 wherein each said gap and each said gap angle is zero.

5. The malleable clip of claim 1 additionally comprising
   a third circumferential clip having a first end, a second end, a length measurable between said first and second ends, a length, a diameter, and a gap angle, said third circumferential clip being spaced apart from and arranged substantially end-to-end with said two-clip array; and
   a resilient link springingly coupling said two-clip array and said third circumferential clip end-to-end to form a three-clip array.

6. The malleable clip of claim 1 wherein said malleable link comprises a plurality of substantially longitudinal malleable members extending between and adjustably coupling said first and second circumferential clips, wherein at least one of said plurality of longitudinal malleable members may be removed by clipping to increase lateral bending compliance of the malleable clip.

7. The malleable clip of claim 6 wherein said first and second circumferential clip gap angles are zero.

8. A method of altering tether force incident to a tether line with a malleable clip, the method comprising
   adjustably clipping the malleable clip of claim 1 to the tether line; and
   bending at least one malleable link of the malleable clip to alter at least one tether force incident to the tether line.

9. The malleable clip of claim 1 wherein said malleable link comprises a plurality of fenestrations substantially transverse to the malleable clip longitudinal axis, wherein the malleable clip comprises substantially malleable base material having a first modulus of elasticity with an outer layer of material having a second modulus of elasticity.

10. The malleable clip of claim 9 wherein said first modulus of elasticity exceeds said second modulus of elasticity.

11. The malleable clip of claim 9 wherein said outer layer material is substantially more resilient than said malleable clip base material.

12. A method of making a malleable clip having a multiphasic lateral compliance characteristic, the method comprising
    providing a malleable clip as in claim 1, said malleable clip comprising a substantially malleable base material having a first modulus of elasticity;
    fenestrating said malleable link with at least one substantially transverse fenestration; and
    coating at least a portion of said malleable link with an outer layer material having a second modulus of elasticity and penetrating at least a portion of said at least one substantially transverse fenestration.

13. The method of claim 12 wherein said first modulus of elasticity exceeds said second modulus of elasticity.

14. The method of claim 12 wherein said outer layer material is substantially more resilient than said malleable link base material.

15. A malleable clip, comprising
    first, second and third circumferential clips, each said circumferential clip having a first end, a second end, a length measurable between said first and second ends, a length, a diameter, a gap and a gap angle, said first, second and third circumferential clips being spaced apart and arranged substantially end-to-end in a three-clip array;
    a first malleable link having a first lateral bending compliance and adjustably coupling said first and second circumferential clips end-to-end; and
    a second malleable link having a second lateral bending compliance and adjustably coupling said second and third circumferential clips end-to-end, wherein said first malleable link compliance is greater than said second malleable link compliance.

16. The malleable clip of claim 15 wherein said first, second and third circumferential clip gap angles do not overlap.

17. The malleable clip of claim 15 wherein each said gap and each said gap angle is zero.

18. The malleable clip of claim 15 additionally comprising
    a fourth circumferential clip having a first end, a second end, a length measurable between said first and second ends, a length, a diameter, a gap and a gap angle, said fourth circumferential clip being spaced apart from and arranged substantially end-to-end with said three-clip array; and a resilient link springingly coupling said fourth circumferential clip and said three-clip array to form a four-clip array.

19. The malleable clip of claim 18 wherein said first, second, third and fourth gap angles are each about 80°.

20. The malleable clip of claim 18 wherein said gap angles are spaced about 90° apart.

21. A malleable clip, comprising a clip array, comprising a plurality of circumferential clips, each said circumferential clip having a first end, a second end, a length measurable between said first and second ends, a diameter, a gap and a gap angle, said plurality of circumferential clips being spaced apart and arranged substantially end-to-end in a multi-clip array;

a malleable link adjustably coupling end-to-end each two adjacent circumferential clips of said plurality of circumferential clips;

at least one additional circumferential clip, each said at least one additional circumferential clip having a first end, a second end, a length measurable between said first and second ends, a diameter, a gap and a gap angle, each said at least one additional circumferential clip being spaced apart and arranged substantially end-to-end with said multi-clip array; and a resilient link springingly coupling end-to-end each said at least one additional circumferential clip with said multi-clip array.

22. The malleable clip of claim 21 wherein each said gap and each said gap angle is zero.

* * * * *